UNITED STATES PATENT OFFICE.

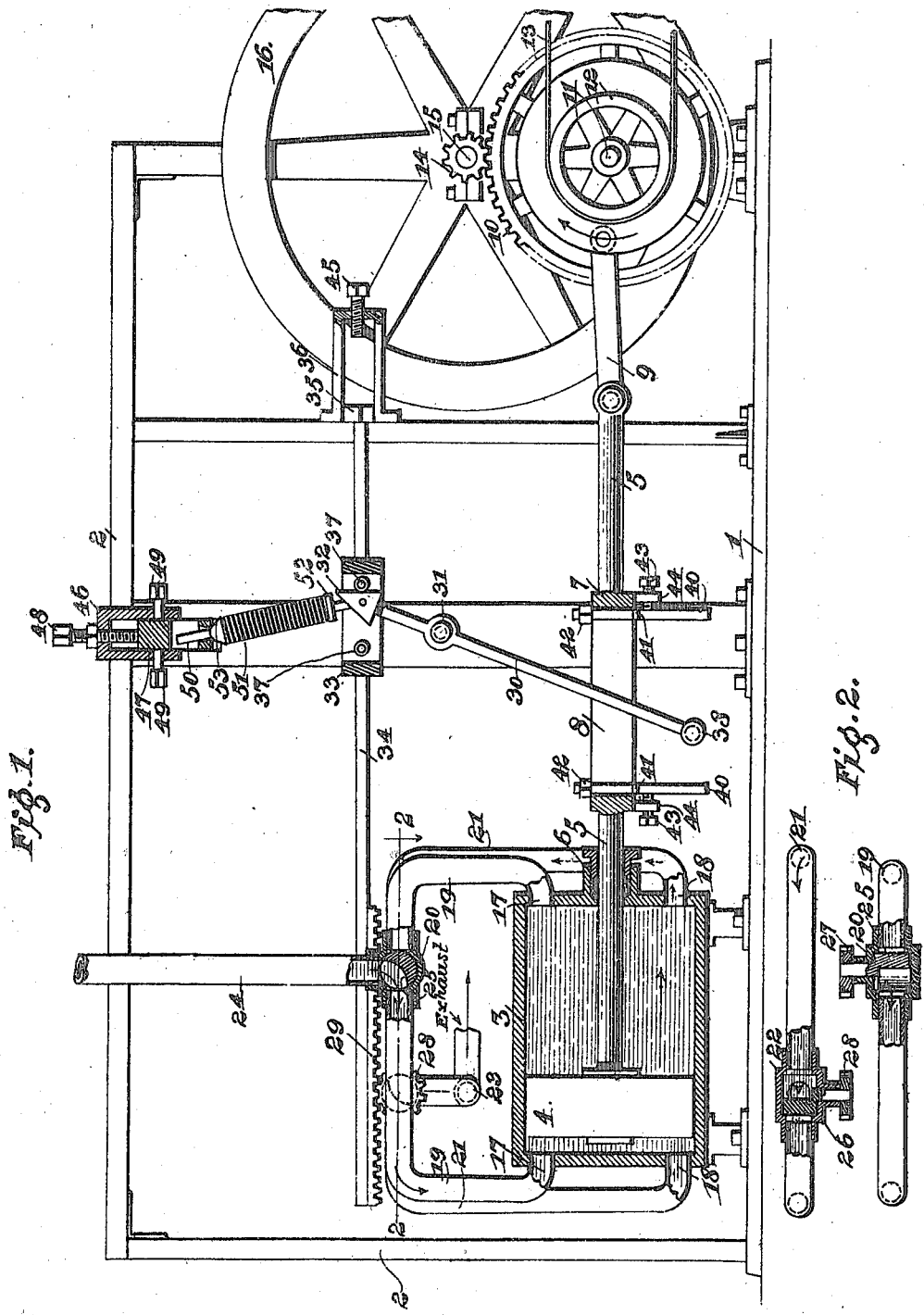

RUBÉN RIVERA, OF SONSONATE, SALVADOR.

HYDRAULIC MOTOR.

1,233,914. Specification of Letters Patent. Patented July 17, 1917.

Application filed July 13, 1916. Serial No. 109,055.

*To all whom it may concern:*

Be it known that I, RUBÉN RIVERA, a citizen of the Republic of Salvador, and a resident of Sonsonate, in the Republic of Salvador, Central America, have invented a certain new and useful Improvement in Hydraulic Motors, of which the following is a specification.

My invention is an improvement in hydraulic motors, and has for its object to provide a motor, which while simple in construction, is very efficient because of the novel arrangement of the valve mechanism in which the shifting of the valve is automatic and instantaneous, and wherein the usual valve chest arranged adjacent to the cylinder and port to connect directly therewith, is dispensed with.

In the drawings:

Figure 1 is a side view of the motor with parts in section, and

Fig. 2 is a section on the line 2—2 of Fig. 1, looking in the direction of the arrow adjacent to the line.

In the present embodiment of the invention, a base 1 is provided, upon which is mounted a frame 2, supporting a cylinder 3. Within this cylinder is arranged a piston 4, connected with a rod 5, which extends through a stuffing box 6 at one end of the cylinder, and has a cross head 7 interposed within its length, the said cross head having a longitudinally extending slot or passage 8. A pitman 9 connects the rod 5 with the wrist pin on a gear wheel 10, which is secured to the shaft 11 journaled in the frame. A pulley 12 is secured to the shaft, and by means of a belt 13 the pulley may be connected with the apparatus to be operated. The gear wheel 10 meshes with a pinion 14 on a fly-wheel shaft 16.

The cylinder is provided with inlet ports 17 at its opposite ends and with outlet ports 18, the ports 17 being near the top of the cylinder and the ports 18 near the bottom, and the inlet ports 17 are connected by pipes 19 with a valve casing 20. The ports 18 are connected by pipes 21 with a similar casing 22, and an exhaust pipe 23 leads from the casing 22 to a suitable place of discharge. An inlet pipe 24 is connected with the valve casing 20, and a valve 25 is arranged within the said casing for alternately connecting the pipes 19 with the pipe 24. A valve 26 is arranged within the casing 22, and by means of this valve the pipes 21 may be alternately connected with the exhaust pipe 22. Each of these valves 25 and 26 is provided with an axial extension carrying a pinion 27 or 28 respectively.

The valves are operated in unison by a rack bar 29 which engages the pinion, and the said rack bar is operated by a lever 30, which is pivoted to the frame intermediate its ends, as indicated at 31. The upper end of the lever is provided with a substantially triangular cam member 32 which engages within the longitudinally extending passage of a cross head 33 interposed within the length of a link 34, connected at one end to the rack bar 29, and having at the other end a head 35, which moves within a guide 36 secured to the frame. Rollers 37 are journaled transversely of the passage of the cross head, and these rollers are adapted to be engaged by the opposite side faces of the triangular head for operating the rack bar when the lever is actuated.

The lower end of the lever 30 extends through the passage 8 of the cross head 7, and the said lower end is provided with a roller 38 which is designed to engage members 40 at the opposite ends of the passage. These stop members are held within the slot or passage, each having oppositely extending shoulders 41 below the slot or passage, and being engaged by nuts 42 above the passage to clamp the stop members in the passage. By loosening the nuts 42, the stop members may be adjusted with respect to each other. Each stop member is engaged by a set screw 43 passing through a depending lug 44 in the adjacent end of the cross head, to prevent outward movement of the stop member at the lower end.

It will be obvious that when the piston reciprocates the lever 30 will be swung through the engagement of the stop members 40 with the roller 38, and since the head 32 at the upper end is in the cross head 33, the said cross head will be reciprocated and will reciprocate the rack bar, to move the valves 25 and 26. The guide 35 is provided at the end remote from the rack bar, with a set screw 45 which limits the movement of the link 34 toward the fly-wheel.

Another guide 46 is arranged just above the cross head 33, and within this guide is a slide 47. A set screw 48 is threaded through the upper end of the guide and engages the slide and is rotatably connected with the upper end of the slide to permit the slide to be adjusted in the guide, and a locking nut is provided for locking the set screw in adjusted position. Other set screws 49 are threaded from opposite sides of the guide into contact with the slide for assisting to hold the same in adjusted position.

A rod 50 has one end pivoted to the head 32, and the other end passes through an opening in the lower end of the guide and into a longitudinally extending recess in the guide, in such manner that when the lever 30 rocks, the rod 50 may be rocked therewith. A coil spring 51 encircles this rod between stops 52 and 53 on the rod, the latter stop being movable on the rod and engaging the lower end of the slide. The external surface of the said stop 53 is conical as shown, and it will be evident that when the lever 30 and rod 50 are rocked, the spring will be compressed, since the rod must move upward, as it passes over the dead center.

The operation of the improvement is as follows: With the parts in the position of Fig. 1, the right end of the cylinder has just been connected with the exhaust, and the left end with the inlet. The motive fluid now passes through the pipe 21 at the left, driving the piston to the right, and forcing out the water through the pipe 21 at the right to the exhaust. As the piston nears the end of its movement to the right, the stop 40 at the left will engage the roller 38 and will quickly swing the lever 30. As the lever swings, it will be eventually engaged at its upper end by the roller 37 at the left of the cross head 33, and the cross head and the rack bar 29 will be moved to the right.

As the lever passes the dead center, the spring 51, which is compressed, will expand, quickly forcing the lever and the cross head and rack bar to the limit of their movement toward the left. The positions of the valves 25 and 26 are now reversed, the right end of the cylinder being connected with the inlet, and the left end to the exhaust.

I claim:

1. In a hydraulic motor, a cylinder, a piston in the cylinder and having a rod, said cylinder having at each end an inlet and an outlet port, a rotatable valve for controlling each set of ports, each valve having a pinion, a rack bar engaging both pinions for operating them in proper sequence, the cylinder rod and the rack bar having longitudinally extending passages, a vibrating lever pivoted between the rod and the bar and having its ends engaging with the ends of the passages, a rod pivoted to that end of the lever engaging the rack bar passage, a guide for the other end of the rod, and a coil spring encircling the rod and compressed when the rod moves upward.

2. In a hydraulic motor, a cylinder, a piston in the cylinder and having a rod, said cylinder having at each end an inlet and an outlet port, a rotatable valve for controlling each set of ports, each valve having a pinion, a rack bar engaging both pinions for operating them in proper sequence, the cylinder rod and the rack bar having longitudinally extending passages, a vibrating lever pivoted between the rod and the bar and having its ends engaging with the ends of the passages, a rod pivoted to that end of the lever engaging the rack bar passage, a guide for the other end of the rod, and a spring in connection with the lever for moving the lever suddenly when the spring is under tension and has passed the dead center.

RUBÉN RIVERA.